W. R. ROGERS.
SELVAGE SEVERING MECHANISM.
APPLICATION FILED JULY 28, 1916.

1,256,731.

Patented Feb. 19, 1918.
5 SHEETS—SHEET 1.

Attest:

Inventor
William R. Rogers
By Wilson W. Hoover
Attorney

W. R. ROGERS.
SELVAGE SEVERING MECHANISM.
APPLICATION FILED JULY 28, 1916.

1,256,731.

Patented Feb. 19, 1918.
5 SHEETS—SHEET 3.

Attest:

Inventor
William R. Rogers
By Wilson W. Hoover
Attorney

W. R. ROGERS.
SELVAGE SEVERING MECHANISM.
APPLICATION FILED JULY 28, 1916.

1,256,731.

Patented Feb. 19, 1918.
5 SHEETS—SHEET 4.

Attest:
E. S. Mitchell

Inventor
William R. Rogers
By Wilson W. Hoover
Attorney

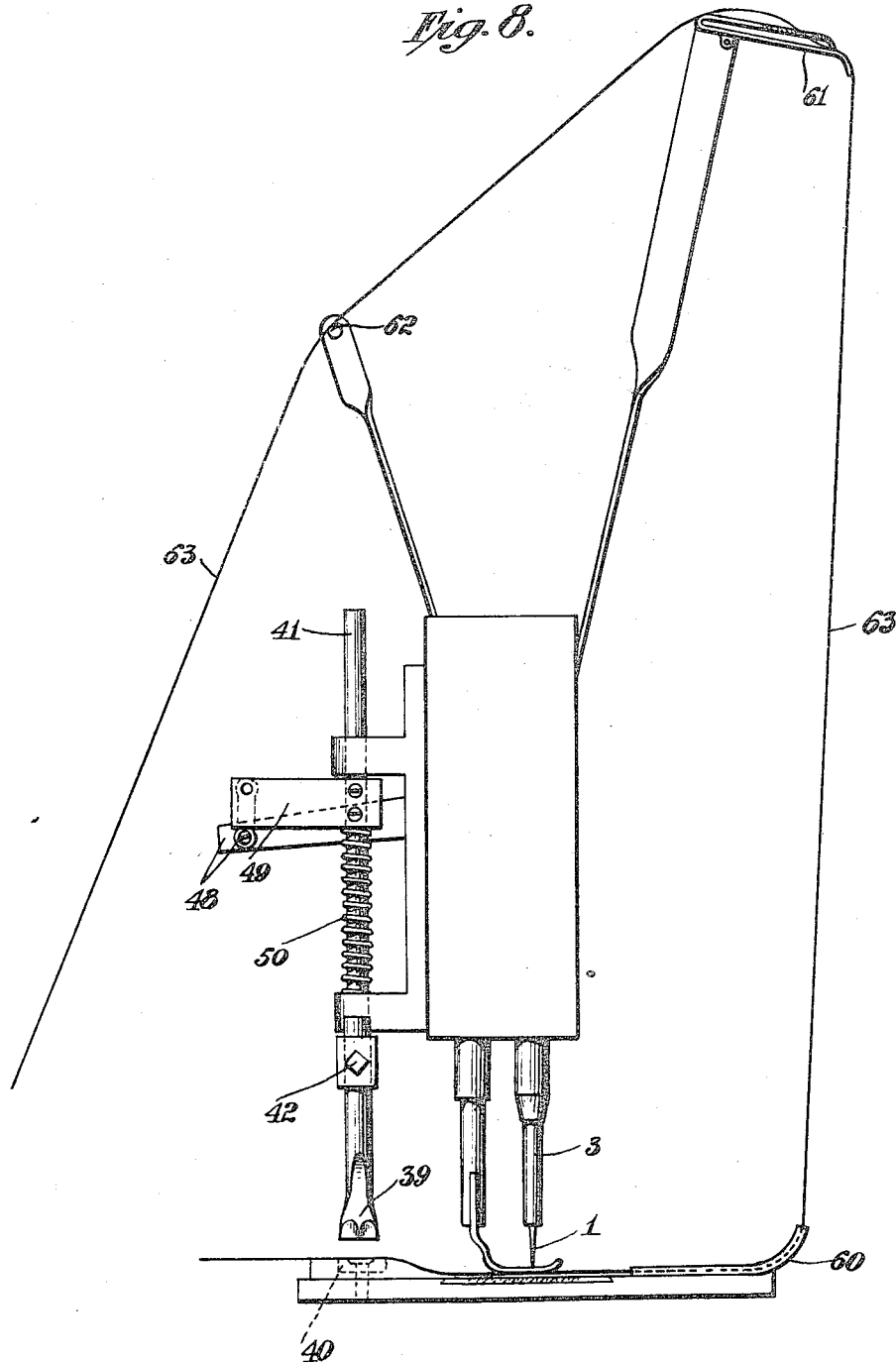

UNITED STATES PATENT OFFICE.

WILLIAM R. ROGERS, OF NEWARK, NEW JERSEY, ASSIGNOR TO WILLIAM RAUBITSCHEK, OF BROOKLYN, NEW YORK.

SELVAGE-SEVERING MECHANISM.

1,256,731.                Specification of Letters Patent.    Patented Feb. 19, 1918.

Original application filed May 20, 1916, Serial No. 98,971. Divided and this application filed July 28, 1916. Serial No. 111,790.

*To all whom it may concern:*

Be it known that I, WILLIAM R. ROGERS, a citizen of the United States, residing in the city of Newark, county of Essex, State of New Jersey, have invented an Improved Selvage-Severing Mechanism.

My invention relates more particularly to an automatic selvage severing mechanism, in a machine adapted to produce a stitched edging of a determinate pattern, or design, including scalloped edging.

I am aware that in the present state of the art, it is not new to mechanically produce a stitched edging, including a scalloped edging, but the sewing machines adapted for the purpose are not provided with mechanism for the automatic severing of the selvage from the product of the stitching operation and to thus render the product commercial, in competition with the woven edging. I am also aware that by a separate machine and at a second operation, selvage is now mechanically severed from stitched edging, thus adding an unnecessary burden and charge on manufacturer's cost, while usually the product is marketed with the selvage attached.

Among other objects of my invention are the removal of these objections by providing a mechanism with which to supplement the stitching operation and by its automatic operation to cut the selvage from the material as the stitching operation is completed, without in any way impeding, or interrupting, the continuous forward progress of the material to position for the successive stitching and severing operations, as hereinafter described.

This application is a division of applicant's application for a machine to make scalloped edging, Serial No. 98,971, filed May 20, 1916.

Having thus generally described some of the objects of my invention, I will now more particularly describe the latter by reference to the annexed drawings, which show a machine embodying my invention, and in which similar reference characters indicate identical parts.

In the drawings Figure 1, is a side elevation of the back of the machine, showing generally the pattern cam and related parts; also the device for severing the selvage, with parts broken away, as shown.

Figure 4:
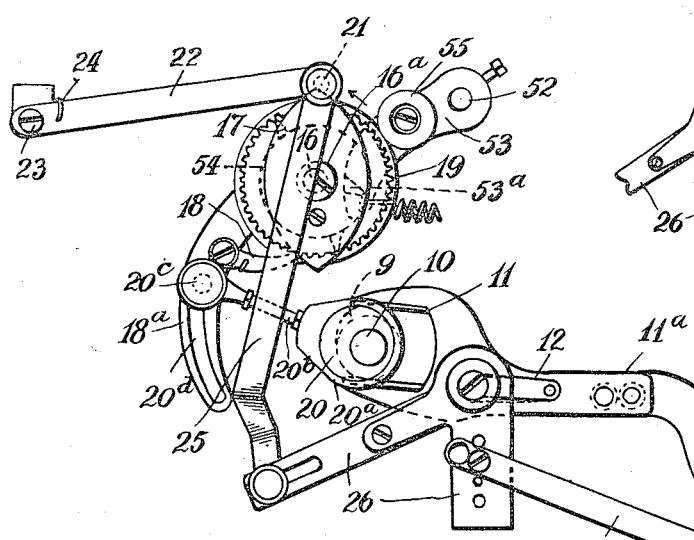
Fig. 4, is an enlarged detail of the vibrating mechanism and the pattern cam, controlling the amplitude and limiting the section of the vibratory arc within which the motion shall take place.
Figure 4A:
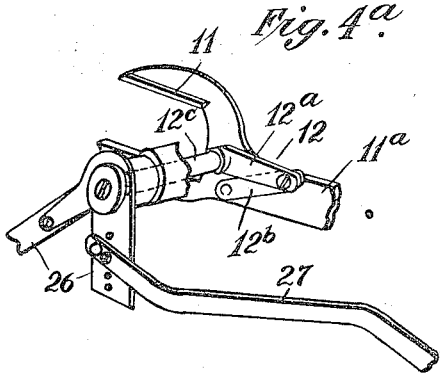

Fig. 4$^a$, is a detail of the compensating link system in the vibrating needle mechanism.

Figure 5:
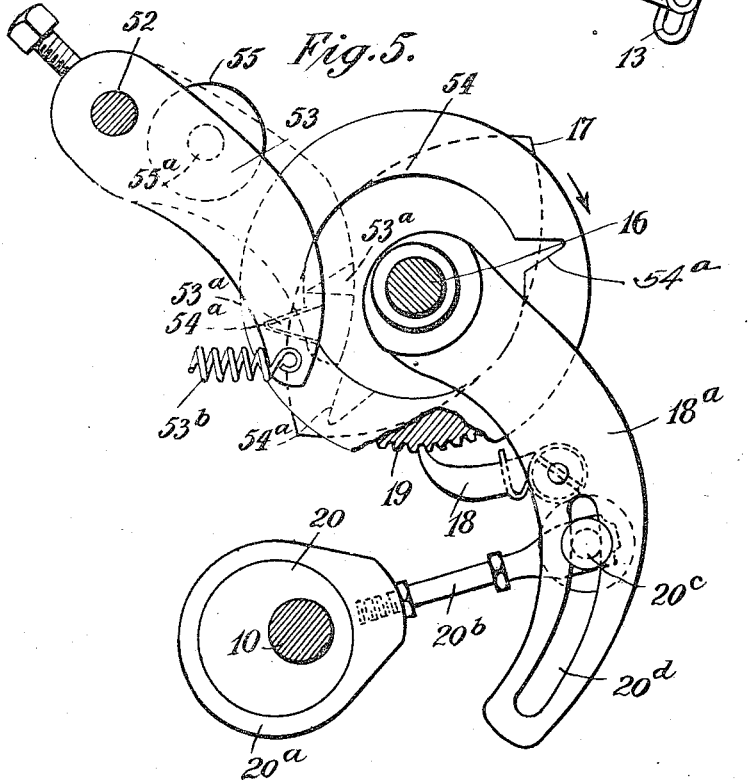

Fig. 5, is an enlarged interior view of the cam and pawl operating the clutch and showing the step feed for the pattern cam.

Figure 1:
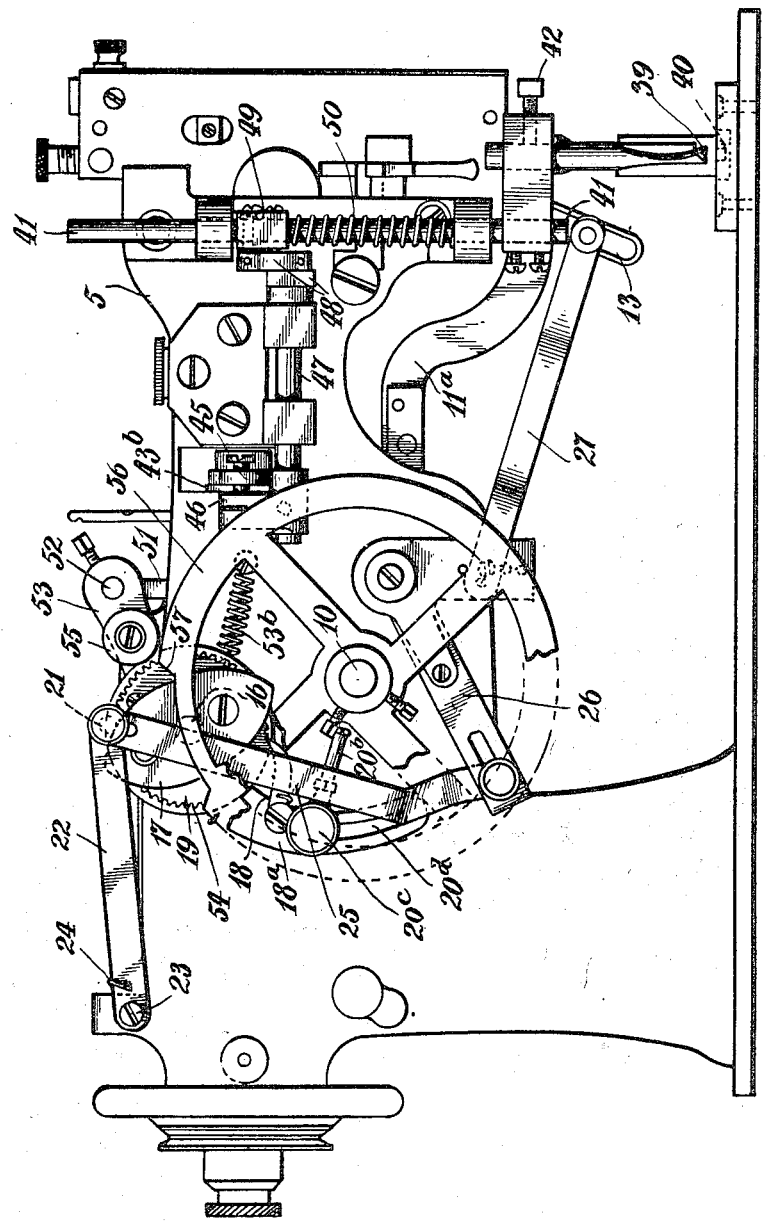
Figure 2:
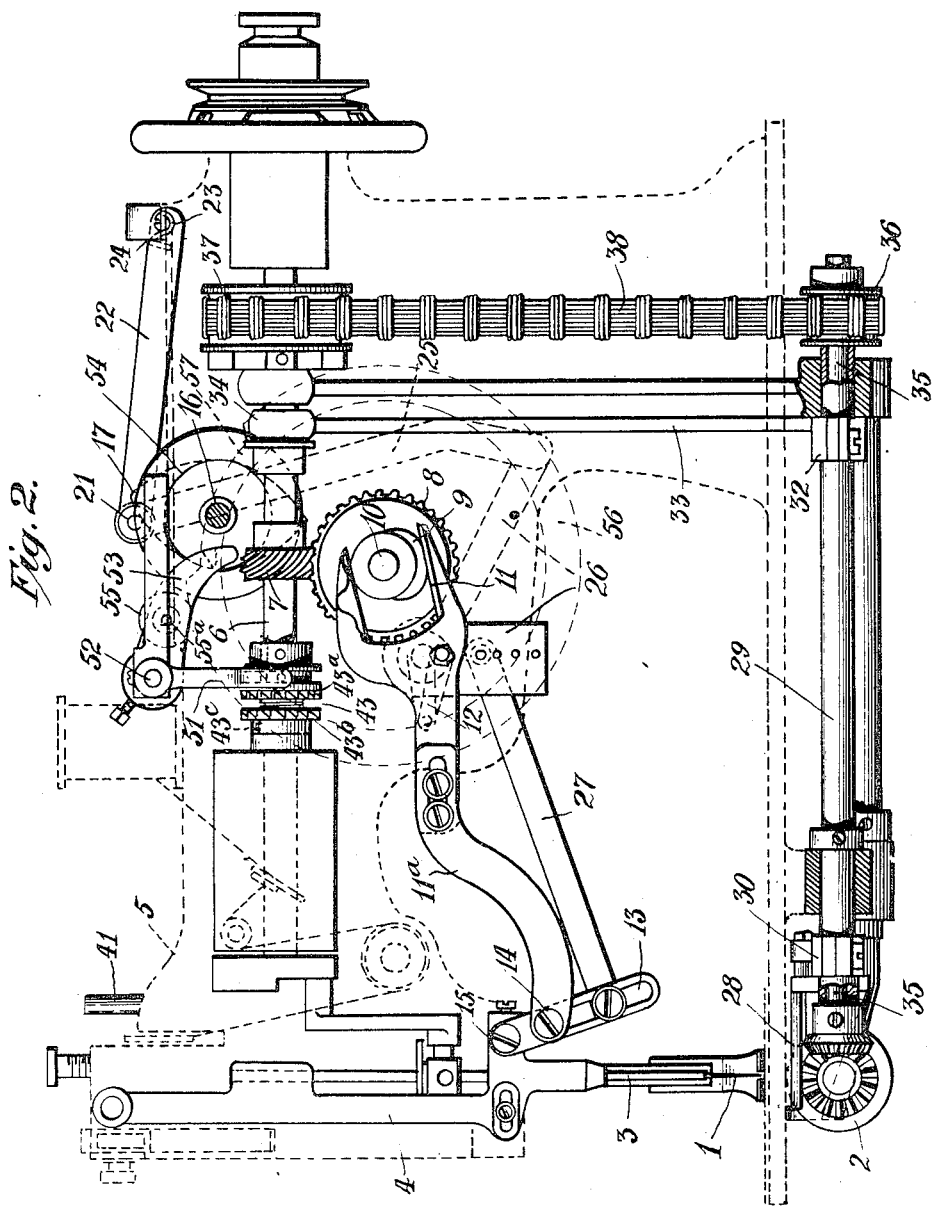
Fig. 2, is a side elevation of the front of the machine, modified to show certain parts in section and elevation and others indicated.
Figures 3, 6, 7:
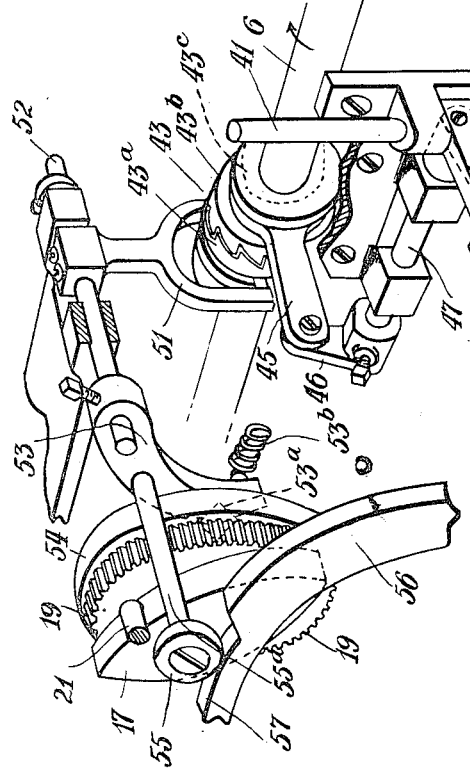
Fig. 3, is a perspective view, showing in detail the selvage severing device and clutch mechanism controlling the same.

Fig. 6, is a diagrammatic view of the scalloped edging produced by the machine and of the cutting die in operative position.

Fig. 7, is a view of the product with the selvage removed and showing another pattern design for stitched sections.

Fig. 8, is a schematic front view, showing the automatic device for positioning the material.

The machine shown in the drawings, is of the Singer type to produce a zigzag lock stitch; the mechanism for vibrating the needle bar is of the usual construction.

To this mechanism I have added automatic means for variably controlling the successive vibratory motions of the needle bar, as shown.

I have also added to the usual mechanism the automatic device, which is the subject of this application, for severing the selvage, as heretofore stated.

The stitch producing mechanism consists of a needle 1, and the usual looping device 2. The needle 1, is secured in the needle bar 3, mounted to reciprocate on the arm 4, fulcrumed at its upper end, on a bracket arm 5, of the sewing machine, as shown.

By this arrangement, the needle bar can be vibrated laterally to the right or left, relatively to the operator, or line of direction of the advance of the material, from its vertical position, or to both right and left, in a single vibratory movement.

The needle bar 3, is normally vibrated to produce a zigzag stitch, and is reciprocated downwardly each time it is deflected by the vibrating mechanism; the stitches thus produced being at an angle with the line of the direction of the forward advance of the material.

The normal vibratory impulses are given to the needle bar 3, from the needle bar shaft 6, by a worm 7, on the latter, which engages with another worm gear 8, carried by the transverse shaft 10, on which is also mounted an eccentric cam 9. Engaging with the eccentric cam 9, is a yoke 11, carried on the end of a reciprocating arm 11$^a$. The reciprocating arm 11$^a$, is adjustably secured by a screw 14, to a slot arm 13, secured to the needle bar arm 4, at 15. The needle bar arm 4, and with it the needle bar 3, is thus reciprocated laterally by the arm 11$^a$, but its motion may be variably controlled as hereafter set forth. Such control is permitted by the link system 12, comprised of an arm 12$^a$, fixed to the transverse shaft 12$^c$, which is pivotally connected with the yoke 11, by a link 12$^b$, as is clearly shown in detail Fig. 4$^a$.

Keyed on the stud 16, of the bracket arm 5, is a rotary pattern cam 17, for the automatic control of both the amplitude of the lateral vibratory motions of the needle bar 3, and of the section of the vibratory arc described by it, within which each succeeding vibratory motion shall occur, or within which it shall be limited, thus determining the contour, or pattern of the design to be reproduced by the stitching operation. The cam 17, takes motion from the needle bar shaft 6, through a step feed, comprising a pawl 18, and ratchet 19; the pawl 18, and ratchet 19, being operatively controlled by an eccentric 20, on the transverse shaft 10. The pawl 18, is adjustably timed to advance one step for each downward reciprocation of the needle bar 3. The pawl is carried by an arm 18$^a$, which is fulcrumed on the stud 16, and adjustably connected to the eccentric strap 20$^a$, by the link 20$^b$, by means of the set screw 20$^c$, let through the slot 20$^d$, in the arm 18$^a$, and the throw of the pawl may be adjusted, if desired, to advance the ratchet two or more steps at each reciprocation of the needle bar.

A roller 21, carried on the arm 22, pivoted on the bracket arm 5, by a stud 23, is maintained in contact with the periphery of the rotary pattern cam 17, by a compression spring 24, mounted on the stud 23. The outer end of the arm 22, is connected with a system of levers comprising the members 25, 26, 27, as shown, the last member 27, of which, is adjustably engaged in the slot in the vibrating arm 13, by a set screw as shown. The periphery of the cam 17, is given a figure, or contour, corresponding to the pattern of the design to be produced by the stitching operation, which, in the case of the cam shown, is of a crescent form, as shown in Figs. 6 and 7; and produces a scalloped edging; but the pattern cam 17, is removably mounted on the stud 16, being retained in position by the screw 16$^a$, and, as obvious, the pattern may be changed, by substituting a different cam, to produce any design for which the mechanism is adapted. The stitching operation on a pattern section is completed on every half turn or revolution of the pattern cam 17.

The feed mechanism is of the usual design to provide a continuous forward feed, and an up and down swinging motion is given to the feed bar 28, by the usual mechanism, including a hollow rock shaft 29, having an arm 30, movably engaging the usual fork formed on the feed bar 28. The shaft 29, is provided, near its rear end, with an arm 32, connected by an eccentric rod 33, with an eccentric 34, mounted on the needle bar shaft 6, so that a continuous rocking motion is operatively given to the shaft 29.

Through the hollow shaft 29, extends the shaft 35, driving the looping device 2, and itself being rotated by the pulleys 36, and 37, and a belt 38, from the needle bar shaft 6.

The fabric strip 63, which is usually of indeterminate length, passes through a suitable holder 60, attached to the base on the main frame of the machine as shown in Fig. 8. Prior to reaching the holder the strip 63 passes through the tension device 61 and it is guided to the said tension device over the guide rod 62.

The mechanism for the automatic severing of the selvage from the edging, consists of a cutting die 39, and a matrix 40, which correspond to the contour of the pattern of the design, which is produced by the stitching mechanism, or the section thereof from which the die severs the selvage. The cutting die 39, is removably mounted on the plunger shaft 41, as shown, and is retained in position by the set screw 42. The female die or matrix 40, is screwed in the bed plate of the machine as shown. The reciprocations of the plunger shaft 41, are so timed with the stitching mechanism, that it is operatively reciprocated to sever the selvage from a pattern section, or from a space equivalent to it, for each stitching operation on a corresponding pattern section.

This is accomplished by a geared clutch 43, carried by the needle bar shaft 6. This clutch is composed of two parts, 43$^a$, and 43$^b$. The part 43$^a$, is keyed to the needle bar shaft 6, and rotates with it. The part 43$^b$, is loosely mounted on the said needle bar shaft, and has attached thereto, an eccentric 43ᶜ, on which is mounted an arm 45, attached to a link 46, which rocks the shaft 47; at the other end of which shaft, is attached the link system 48, fulcrumed on the stud 49, carried by the plunger shaft 41.

The spring 50, operatively returns the plunger shaft 41, to its normal position after each forward movement and the disengagement of the clutch 43. The clutch member 43ᵃ, is operated by a yoke 51, carried by the rock shaft 52, which is mounted to reciprocate on the bracket arm 5, of the machine. The rock shaft 52, carries the pawl 53, rigidly mounted thereon, and provided with a tooth 53ᵃ, which is normally held in contact with the interior face of the cam 54, by a spring 53ᵇ. This cam is recessed at 54ᵃ, to receive the tooth 53ᵃ, in operative engagement. Such engagement of the pawl 53 occurs twice for every revolution of the pattern cam 17 both being secured to the ratchet 19. The disengagement of the pawl 53, is secured by the automatic action of the roller 55, which is mounted on a stud 55ᵃ, attached to the pawl 53. This roller 55, is normally maintained in contact with the periphery of the recess wheel 56, mounted on the transverse shaft 10, and is so timed as to engage in the recess 57, of the wheel 56, at the instant that the tooth 53ᵃ, engages in the recess 54ᵃ, of the cam 54. When the roller 55 being engaged in the recess 57 is raised therefrom to the periphery of the wheel 56 on its disengagement the upward motion of the roller stud 55ᵃ lifts the pawl 53 thus disengaging the tooth 53ᵃ from the recess 54ᵃ in the cam 54. The clutch 43 is thus thrown out of operative engagement by the disengagement of the roller 55 from the recess of the wheel 56.

This is accomplished by the roller stud 55ᵃ, releasing the tooth 53ᵃ, on the pawl 53, from operative engagement with the recess 54ᵃ, in the cam 54, as is clearly shown in detail Fig. 5.

Fig. 8 shows a device for the automatic supply and positioning of the material.

The operation of the machine and more particularly of the device for the automatic severing of the selvage, embodied therein is as follows:

The material 63 is fed to the machine and positioned through the automatic action of the guides 61 and 62 and the holder 60, and tension device shown in connection therewith, which supplies the same to the feeding device by a constant forward motion, in a straight line.

The pattern design is progressively produced in the stitching operation, through the automatic control of the vibratory motions of the needle bar by the pattern cam as described, and a pattern section of the design, is produced twice during each revolution of the latter; the pattern sections are thus produced in an indeterminate series.

The cutting die is, as already stated, timed to reciprocate twice for every revolution of the pattern cam, and the point at which it shall perform its cutting operation whether coincidentally with the completing, of the stitching operation on a pattern section, or at some other point, may also be adjustably determined; in the drawings the die is shown to cut a space equivalent to a pattern section, but not coincidentally with the completion of the stitching operation on another.

The plunger die has, on its cutting face, a pattern corresponding to the contour of the section of the edging from which it severs the selvage, when operatively engaged, which is always equal to the face of a pattern section, and thus the cutting operation progresses at the same rate as the stitching operation, through the timing of the related mechanism as described.

Fig. 6 shows the die in operative engagement and also the needle engaged upon a distant section. The intervening space may be varied as convenient.

The automatic cutting operation following on the stitching operation thus produces a stitched edging without a selvage.

Having thus specified, described and shown the same I claim as novel and my invention:

1. In a machine adapted to produce stitched edging in combination, a needle bar shaft, a pattern cam rotated from such shaft, a clutch mechanism receiving motion from such shaft, a plunger shaft carrying a cutting die and controlled by such clutch mechanism, the die being adapted to sever the selvage from a completed pattern section at each reciprocation and the motions of the pattern cam and plunger shaft being so timed that the latter is operatively reciprocated twice for each revolution of the pattern cam.

2. In a machine adapted to produce stitched edging, a needle bar shaft in combination with a pattern cam rotated from such shaft, a clutch mechanism receiving motion from such shaft, a plunger shaft reciprocated from such clutch, positioned by a spring and carrying a cutting die adapted to trim the selvage from a pattern section at each reciprocation, a yoke connected with the pattern cam and controlling the engagement of the clutch and a related motion between the pattern cam and clutch by which the latter is operatively engaged to reciprocate the plunger shaft twice for each revolution of the pattern cam.

3. In a machine adapted to produce stitched edging, in combination, a needle bar shaft, a pattern cam rotated from such shaft, a clutch receiving motion from such shaft and normally disengaged, a plunger shaft reciprocated from such clutch, elastically positioned and carrying a cutting die adapted to trim the selvage from a pattern section at each engagement with the material, a yoke connected with the pattern cam and adapted to engage the clutch at timed intervals and to retain it in engagement to reciprocate the plunger shaft.

WILLIAM R. ROGERS.

Witnesses:
JNO. S. V. DAVIS,
JULIA MAURER.